(12) United States Patent
Sankabathula et al.

(10) Patent No.: US 7,907,555 B1
(45) Date of Patent: Mar. 15, 2011

(54) RSSI-BASED POWERDOWN APPARATUS AND METHOD FOR A WIRELESS COMMUNICATIONS SYSTEM

(75) Inventors: Dharani Naga Sailaja Sankabathula, San Jose, CA (US); Partha Sarathy Murali, Los Altos Hills, CA (US); Venkat Mattela, San Jose, CA (US)

(73) Assignee: Redpine Signals, Inc., San Jose, CA (US)

( * ) Notice: Subject to any disclaimer, the term of this patent is extended or adjusted under 35 U.S.C. 154(b) by 751 days.

(21) Appl. No.: 11/945,136

(22) Filed: Nov. 26, 2007

(51) Int. Cl.
*G08C 17/00* (2006.01)
*H04L 27/00* (2006.01)

(52) U.S. Cl. .................. 370/284; 370/311; 375/316

(58) Field of Classification Search .................. None
See application file for complete search history.

(56) References Cited

U.S. PATENT DOCUMENTS

| | | | |
|---|---|---|---|
| 7,436,905 B2 * | 10/2008 | Shirakawa et al. | 375/316 |
| 7,522,677 B2 * | 4/2009 | Liang | 375/316 |
| 7,643,573 B2 * | 1/2010 | Kejariwal et al. | 375/297 |
| 7,643,812 B2 * | 1/2010 | Lai | 455/232.1 |
| 7,656,970 B1 * | 2/2010 | Sankabathula et al. | 375/316 |
| 7,706,434 B1 * | 4/2010 | Farjadrad et al. | 375/222 |
| 2005/0084037 A1 * | 4/2005 | Liang | 375/316 |
| 2006/0002495 A1 * | 1/2006 | Shirakawa et al. | 375/345 |
| 2006/0215590 A1 * | 9/2006 | Sharma et al. | 370/311 |
| 2007/0223626 A1 * | 9/2007 | Waxman | 375/316 |
| 2008/0130799 A1 * | 6/2008 | Yousef et al. | 375/345 |

* cited by examiner

*Primary Examiner* — Chi H Pham
*Assistant Examiner* — Soon-Dong D Hyun
(74) *Attorney, Agent, or Firm* — File-EE-Patents.com; Jay A. Chesavage (57) ABSTRACT

A wireless receiver generates quadrature baseband signals which are sampled by a high speed analog to digital converter (IQ ADC) and also uses a receive signal strength indicator (RSSI) which is sampled by an RSSI analog to digital converter (RSSI ADC). The RSSI ADC signal is processed in combination with an end of packet signal to generate a first threshold from the average RSSI signal after the end of packet with the receive amplifiers set to a comparatively high level. A second threshold is generated by adding a threshold increment to the first threshold, and when the RSSI crosses the second threshold, the IQ ADC is taken out of a standby mode and placed in an active mode for the duration of the packet. The RSSI ADC is enabled from end of packet until packet detection by the baseband processor, and placed in standby at other times. The enabling of each respective ADC only when required reduces power consumption, and the formation of the first and second thresholds after end of packet generates a self-calibrating RSSI signal for use in enabling and disabling the IQ ADC and RSSI ADC.

26 Claims, 12 Drawing Sheets

*Figure 8A*
RSSI analog processing

*Figure 8B*
RSSI analog processing

*Figure 8C*
RSSI analog processing

*Figure 9*

RSSI-BASED POWERDOWN APPARATUS AND METHOD FOR A WIRELESS COMMUNICATIONS SYSTEM

FIELD OF THE INVENTION

The present invention is directed to the field of wireless communication equipment, particularly battery-operated equipment operating in varying SINR (signal plus interference to noise ratio) conditions.

BACKGROUND OF THE INVENTION

Figure 1:
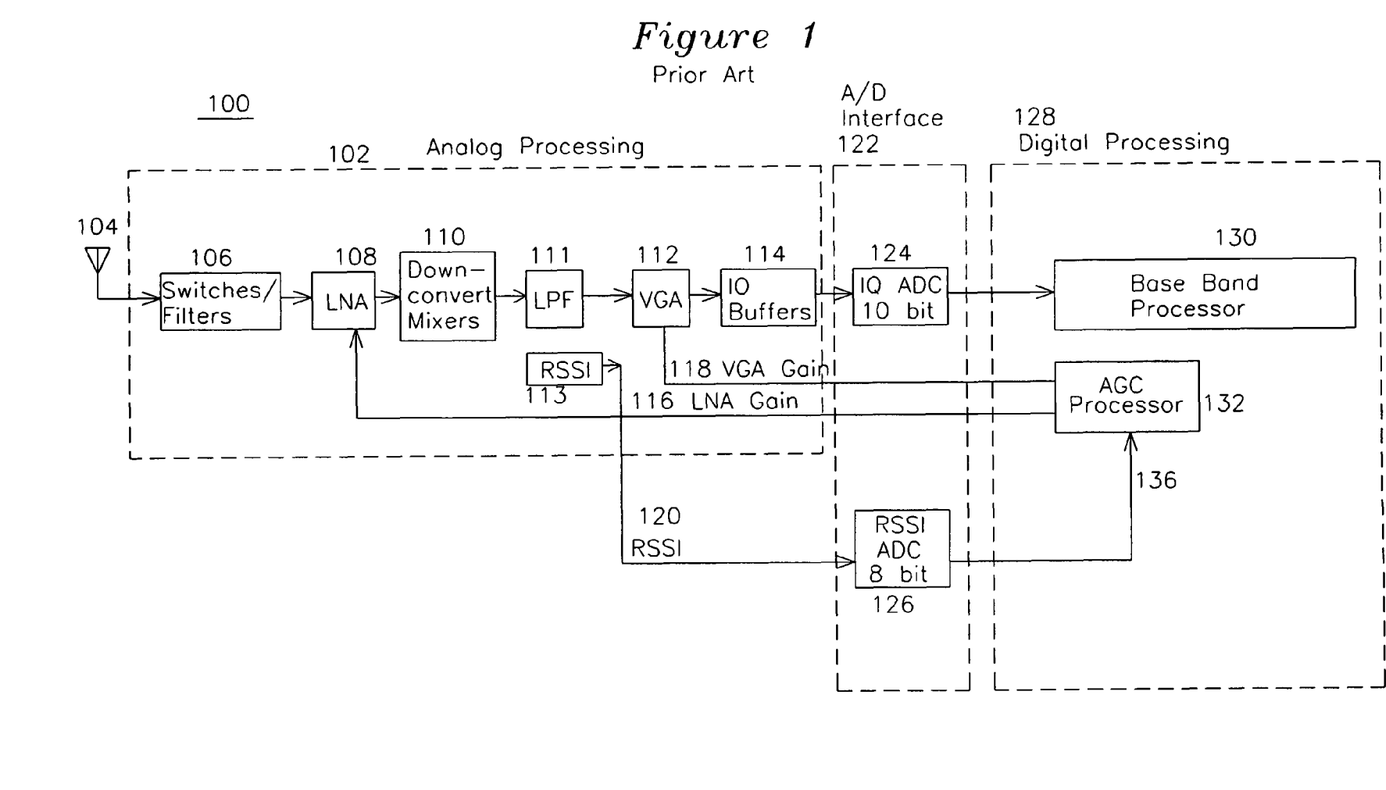
FIG. 1 shows the block diagram for a prior art wireless communications receiver.

FIG. 1 shows a prior art wireless communications receiver 100. An analog part of the receiver 102 receives wireless signals from an antenna 104, which pass through transmit/receive switches and filters 106, and to variable gain low noise amplifier 108, which typically accepts a coarse gain control input 116 for reducing the LNA gain for high signal levels and increasing the LNA gain for low signal levels, thereby keeping the mixer 110 operating linearly in a noise performance optimized operating point. Baseband mixers 110 down-convert the modulated signal to a quadrature baseband signal which is baseband filtered 111 and followed by a variable gain amplifier 112 which optimizes the signal level to the sampling range of the signal leaving the analog signal processing subsection 102 via IO buffers 114 to the A/D interface 122 where the in-phase (I) and quadrature (Q) signals are sampled by analog to digital converter 124, also known as the IQ ADC. The selection of an optimum VGA 112 gain results in the IQ ADC 124 sampling the signal to fill the linear range of the A/D converter 124, after which the signals are passed to the baseband processor 130. A received signal strength indicator (RSSI) signal 120 is typically generated by one or more of the analog processing stages, which is shown as RSSI generation function 113. The RSSI signal 120 provides a coarse indication of incoming signal strength, and is typically digitized by RSSI ADC 126 and processed by AGC processor 132 to generate the LNA gain 116 and VGA gain 118. In this manner, the prior art AGC processor samples an RSSI signal and generates gain control signals to optimize the sample range of the ADC and baseband processor 130.

The boundaries of communications receiver 100 are separated into processing sections based on the type of technology in use for that particular section. Analog processing 102 typically uses small signal amplifying elements such as linear amplifiers 108 and 112, buffers 114, and non-linear elements such as mixer 110. Typically these analog components have high current consumption for optimized high speed performance, and the power consumed by analog section 102 is a significant part of the system power. A/D Interface 122 includes high speed IQ ADC 124 which samples the down-converted and filtered baseband signal for processing and low speed ADC 126 for sampling the RSSI signal 120. The IQ ADC 124 typically operates at a much higher sampling rate (80 Mhz typically) and quantization level (10 bit) than the low speed (10 Mhz or less at 8 bit) RSSI ADC 126. The remaining components are digital signal processing elements 128 which have power consumption that is governed by the clock rate of the synchronous clock used to drive the various stages.

For battery powered wireless receivers, it is desired to reduce the power consumption, thereby proportionally increasing the life of the battery powering the receiver. The opportunities for reduced power consumption for each section of the prior art receiver 100 are somewhat limited. The analog processing 102 consumes a fixed amount of power regardless of whether a packet is being received or not, and in operating conditions where the time spent receiving packets is low compared to the time spent listening for packets to receive, a large power savings may be realized by using the IQ ADC and RSSI ADC only during the intervals when they are required. The ADC interface 122 has a power consumption which includes a fixed part and a part that is proportional to the sample rate and bit width of the ADC, and is dominated by high speed converter 124. The digital processing 128 including baseband processing 130 and AGC processor 132 are dominated by displacement currents associated with switching large numbers of signal conductors from one voltage level to another, resulting in a power consumption which is largely proportional to clock speed.

OBJECTS OF THE INVENTION

A first object of the invention is a reduced power consumption receiver which samples an RSSI signal immediately after the end of a packet with the gain stages of the receiver set to a noise characterizing level of gain, and forming a first threshold, thereafter forming a second threshold, to which the RSSI is compared to determine when to enable the IQ ADC and begin sampling an arriving packet, thereby generating an RSSI enable signal which enables only circuitry related to forming the threshold, and also forming an AFE enable signal for enabling the analog electronics of the receiver during packet reception.

A second object of the invention is a power saving receiver which generates a first threshold by averaging several RSSI ADC samples after the end of a packet, forming a second threshold by increasing the first threshold, and turning off receiver functions which are not required to generate RSSI when the RSSI is below the second threshold, and turning off RSSI functions for the duration of the received packet.

A third object of the invention is the formation of a first threshold from calibration of RSSI by summing a plurality of previous samples and scaling this result by the number of samples, increasing this value to a second threshold which is above the RSSI noise when a packet is not being received.

A fourth object of the invention is the use of an RSSI estimate in combination with a adaptive RSSI threshold to power-down IQ ADC converters when a packet is not being received.

A fifth object of the invention is the use of an RSSI estimate, in combination with a threshold which is measured and adapted at the end of reception of every valid packet, to power-down at least one of an RSSI ADC converter, an IQ output buffer, or a variable gain amplifier when a packet is being received.

A sixth object of the invention is the use of an RSSI estimate generated from the output of an analog front end, in combination with a threshold which is formed from the sampled IQ ADC output, to reduce the power consumption of an RSSI ADC converter when a packet is not being received, by reducing the clock rate of the IQ ADC during the interval an RSSI estimate is being made.

SUMMARY OF THE INVENTION

In a first embodiment, a received signal strength indicator (RSSI) is used to maintain the IQ analog to digital (IQADC) converters in an operational state when a signal is present and power down the IQADC, and optionally any other processing which is not involved in generation of the RSSI signal when no signal is present by performing a comparison between a computed second threshold level near the end of a current frame and using this threshold to detect the next frame.

In a second embodiment, RSSI calibration is performed by averaging the RSSI following the end of a previous packet, thereby establishing a threshold for use in enabling the IQ ADC converters.

In a third embodiment, the IQ buffers of the analog signal processing section are turned off in response to the RSSI being below a threshold determined by the receiver noise level.

In a fourth embodiment, an RSSI analog to digital converter is turned off from start of packet to end of packet.

In a fifth embodiment of the invention, the first or second embodiment comparison uses an analog comparator.

In a sixth embodiment of the invention, the first or second embodiments of the invention share a single ADC for digitizing RSSI and baseband IQ signals.

DETAILED DESCRIPTION OF THE INVENTION

Figure 2:
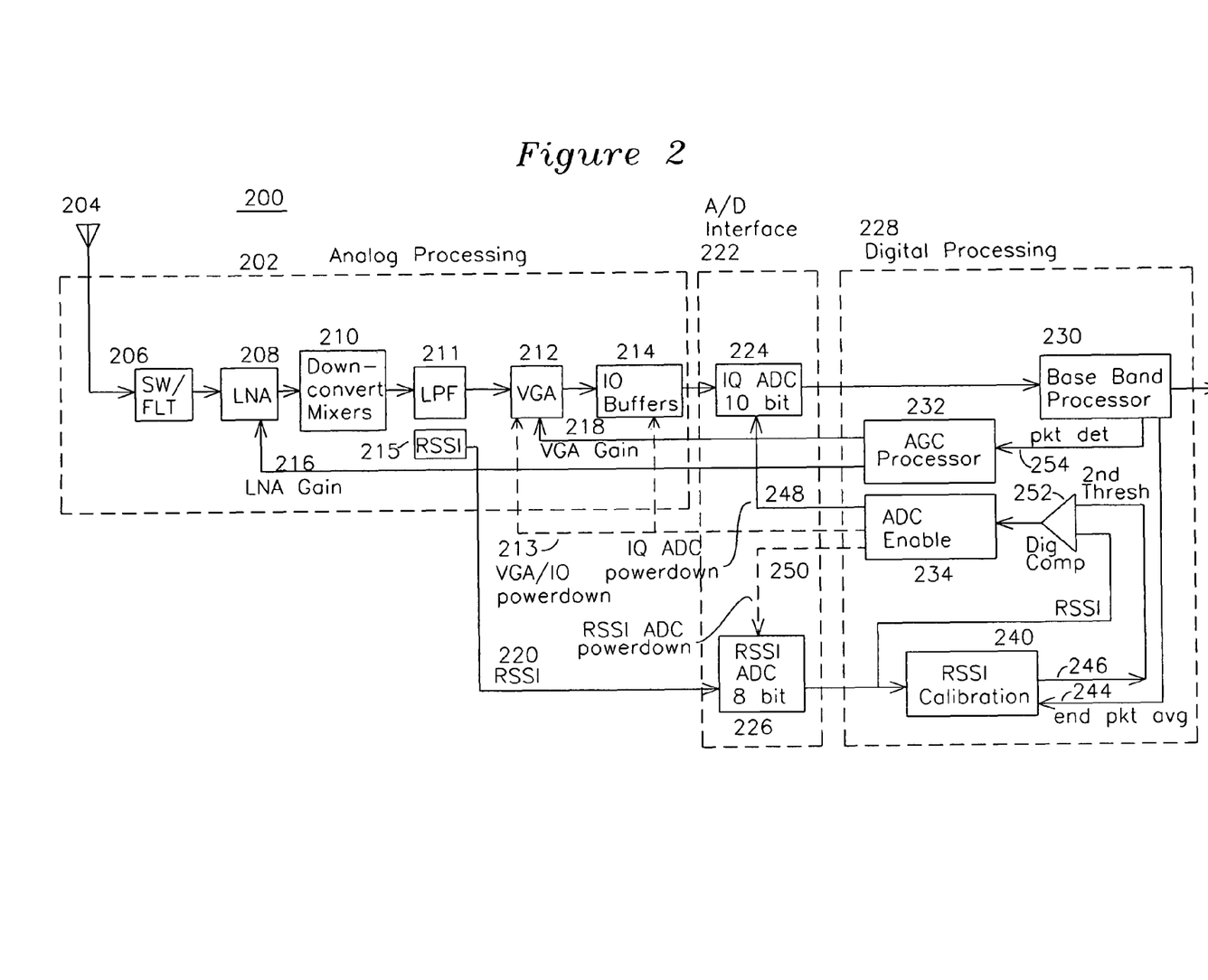
FIG. 2 shows a block diagram for a wireless communications receiver of the present invention.

FIG. 2 shows a wireless communications receiver of the present invention. Wireless signals are received at antenna 204, which are coupled through transmit/receive switch 206 and amplified by low noise amplifier 208, as before. Low noise amplifier 208 includes a coarse gain input 216 which may be used to select one of several gain levels. Typically the gain level of the LNA 208 is chosen to cause the overall system noise figure to be determined by the low noise performance of LNA 208 rather than the higher noise figure of mixers 210. RSSI generation 215 may be separate from, or part of the mixers 210 and generates the RSSI indicator 220, as described earlier. After quadrature mixing 210 which generates I and Q channels, variable gain amplifier 212 and 10 buffers 214 provide the quadrature baseband analog signals I and Q to the high speed IQ A/D converter (IQADC) 224 of the A/D interface 222, where the digitized signals are presented to the base band processor 230.

RSSI calibration function 240 receives the digitized RSSI indication from RSSI ADC 226 in combination with an end of packet signal 244. Upon assertion of end of packet signal 244, the AGC processor 232 sets the VGA gain 218 and LNA 208 gain 216 to a maximum level suitable for noise measurement, such as a characterization gain level, and the RSSI ADC 226 digitizes the RSSI 220 over an averaging interval T1, which in the best mode of the invention may be a time interval equivalent to 128 or 256 symbols during a packet interval, or any number required to generate a receiver noise measurement, which is known as a first threshold. A small increment in the first threshold level is added to form a second threshold, which is used for comparison to determine a possible start of packet based in signal energy. The comparison threshold or second threshold 246 is generated by RSSI calibration function 240, and is formed by adding approximately 2 dB, or anywhere in the range of 1 to 5 db as required for best performance, to the resulting average noise level, also known as the first threshold, formed during the averaging interval T1, and using this second threshold 246 in digital threshold comparator 252 to signal the start of ADC 224 sampling. The output of the comparator 252 is processed to generate IQADC enable 248 and RSSI ADC enable 250, such that the IQADC enable 248 is unasserted from end of packet to start of packet as detected by the digital comparison 252 of RSSI to the threshold, and RSSI ADC enable 250 is unasserted from start of packet to end of packet. The objective of this careful control of the ADC controllers is a large reduction of power by operating the highly power consumptive IQADC 224 only during intervals when a packet is likely to be received, and operating other parts of the circuits only when needed. In this manner, the function of the present invention results in power consumption by the ADC converters only during the intervals of time when they are required for baseband processing 230 and packet energy detection.

Figure 3:
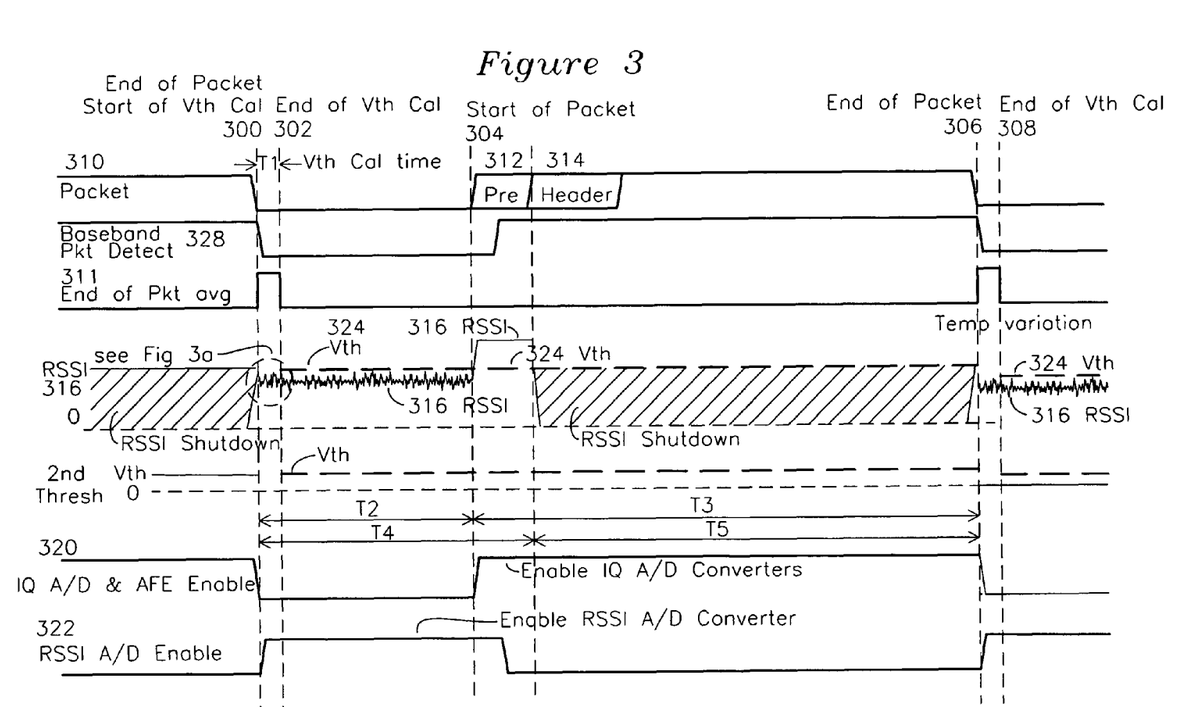
FIGS. 3 and 3A show the waveforms for the operation of the communications receiver of FIG. 2.
Figure 3A:
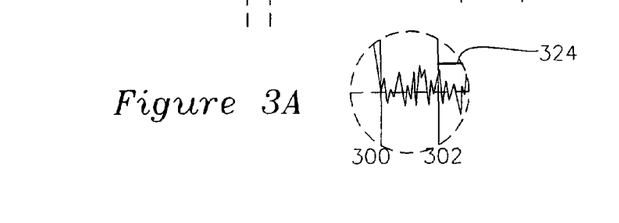

Several power saving opportunities are presented by the configuration of FIG. 2. The RSSI signal 220 can be used with a baseband end of packet averaging signal 244 to generate a first threshold which is increased to a second threshold for early packet detection preceding the baseband processor asserting packet detect 254. The interval from RSSI crossing the second threshold through end of packet may be used to enable the IQ ADC 224. FIG. 3 shows the waveforms for FIG. 2, including end-of-packet average waveform 311, corresponding to signal 244 of FIG. 2 which is generated by the baseband processor 230. The RSSI signal 220 associated with the received packet 310 is shown as waveform 316. When the baseband processor deasserts the packet detect signal 254 (waveform 328), the LNA and VGA are set to maximum gain and the RSSI noise-dominated signal is sampled for an interval shown as Vth Cal time T1 from 300 to 302 (also shown in detail FIG. 3A), and this computation results in the generation of a first threshold representing the average RSSI level, and this is increased to a second threshold 324, which, when crossed by the RSSI signal 220 waveform 316, indicates the likely start of a new packet and change of IQ and RSSI ADC modes between the states of power saving to operational, as described. The RSSI signal 316 is an analog signal subject to temperature and voltage drift over time, and while useful as a signal of relative signal strength, is not useful as an absolute indicator of signal strength, and therefore cannot be used to detect possible start of packet without the additional processing of the present invention. The advantage of the present invention is that by summing the end of packet samples and scaling by the number of samples to create a first threshold, thereafter increasing that by a noise margin to a second threshold which eliminates false triggering, it is possible to generate a second threshold that varies with the current channel noise, and since the time duration from end of one packet to the start of the next is typically much shorter than a thermal drift time constant or variations in noise floor due to interference sources, the frequent recalibration of threshold affords an accurate threshold for the purpose of ADC powersave or operational mode. The powerdown signals generated by the ADC enable function 234 of FIG. 2 may be used to enable 248 IQ ADC functions only during the intervals which require them for an incoming packet, as shown by waveform 320. In the example of FIG. 3, the RSSI is averaged during interval T1 following end of packet to form a first threshold, and an incremental value is added to form the second threshold Vth 324. During the interval T2 which follows the end of packet, the IQ ADC is disabled until the RSSI signal exceeds this second threshold Vth 324, after which the IQ ADC is enabled. Alternatively, to form the second threshold, it is possible to average the incoming RSSI over a smaller interval or window such as 2-16 samples to reduce the effect of noise on the RSSI signal. The second threshold is formed to be a level which is sufficient to reduce the probability that the noise shown on the RSSI signal exceeds the second threshold Vth 324. Once RSSI crosses this second threshold Vth, the IQ ADC is enabled for the duration T3 until the end of packet. Control of RSSI ADC can also be accomplished by enabling the RSSI ADC waveform 322 from end of packet through baseband packet detection, shown as interval T4. The RSSI ADC may then be disabled from start of baseband packet detection (waveform 328) through end of baseband packet detection, shown as interval T5. The regions when the RSSI ADC is not operating and therefore invalid for comparison with second threshold Vth are shown in hashed lines and identified as "RSSI Shutdown" on the RSSI waveform 316. In this manner, the IQ ADC is only active during the interval that high speed sampling is necessary for the operation of the baseband processor 230, and the IQ ADC is inactive at other times, and the RSSI ADC is only active after the end of the current packet, as indicated by the baseband processor, until the start of the next packet, thereby allowing for the generation of a new threshold level for use in detecting the next packet. It is understood that other signals and intervals may be used to control the durations of IQ ADC and RSSI ADC enablement and disablement while still practicing the power saving aspects of the invention as described herein. In a second embodiment, the calibration of an RSSI threshold using the RSSI at the end of a packet is used for powerdown mode as before, and additional receiver functions are disabled. In FIG. 2, any of the receiver functions which are not necessary for the generation of the RSSI indication 220 may be powered down or put in a lower consumption state concurrent with the IQ ADC enable 248, as long as the analog processing element that is put in powerdown or standby state has a recovery time sufficient to allow for correct reception of the preamble at the start of the detected packet. The candidate functions for powerdown with the IQ ADC enable signal are the functions not required for RSSI generation, such as the VGA 212 and IO buffers 214 shown controlled by powerdown signal 213, as well as the IQ ADC 224 as shown controlled by powerdown signal 248. In this manner, the sampled RSSI signal 220 can be used to trigger the start of a packet and it can also be used after the end of a current packet to generate a threshold for use in detecting the following packet, and this threshold will be self calibrating for the effects of temperature, drift, gain variation, and channel noise, since these effects will be incorporated into the threshold value that is computed.

Figure 4A:
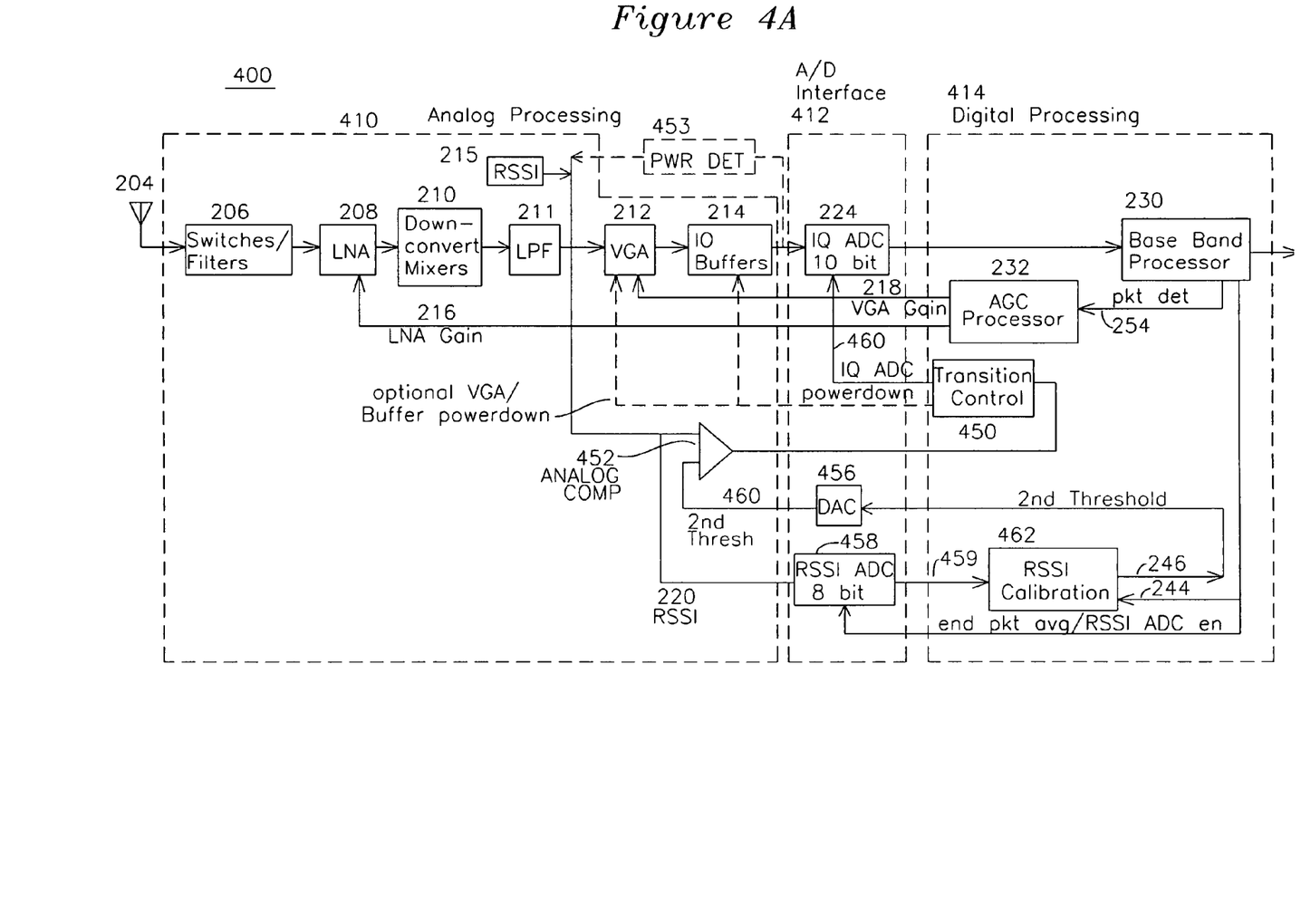
FIG. 4A shows the block diagram for an alternate embodiment of a power saving ADC controller.

FIG. 4A shows an alternative embodiment 400 whereby the comparison operation is performed by an analog comparator 452 rather than the digital comparator 252 of FIG. 2. For convenience in understanding the invention, analog functions are shown within boundary 410, A/D and D/A conversions are shown in conversion boundary 412, and digital processing is shown in boundary 414. The RSSI signal 220 is sampled by RSSI ADC 458, which is enabled and active only during the end of packet average interval of signal 244, and is powered down or in standby at other times. During the end of packet noise averaging interval, RSSI calibration 462 is performed, and the first threshold average noise level is generated based on digitized samples from 458 of RSSI 220 over a time interval T1, as before. The second threshold is generated 462 by adding an increment of 1 to 5 dB to the first threshold level, as required to minimize false triggering of the IQ ADC from noise signals, as previously described. The second threshold is provided by digital signal 246, which is converted at the end of the second threshold calculation by DAC 456 to an analog signal that is fed to analog comparator 452, along with the analog RSSI signal 220. An optional transition control 450 is shown which may perform time-domain analysis to remove false triggering glitches from the output 450 caused by noise on RSSI 220. For example, the transition control 450 may analyze the output of comparator 452 and assert the IQ ADC powerdown signal only after the comparator output 452 has been continuously asserted for an interval of time. After the second threshold calculation has been performed and provided to analog comparator 452, the functions associated with the generation of the second threshold level may be powered down by the end of packet averaging signal 244 until the next end of packet interval as determined by the baseband processor 230. The candidate functions for powerdown after second threshold generation are RSSI ADC 458 and RSSI calibration generation 462. If the second threshold analog value is stored in an analog sample and hold function prior to the comparator 452, or included in DAC 456, then the DAC 458 may be powered down or placed in a low power consumption standby state as well.

Figure 4B:
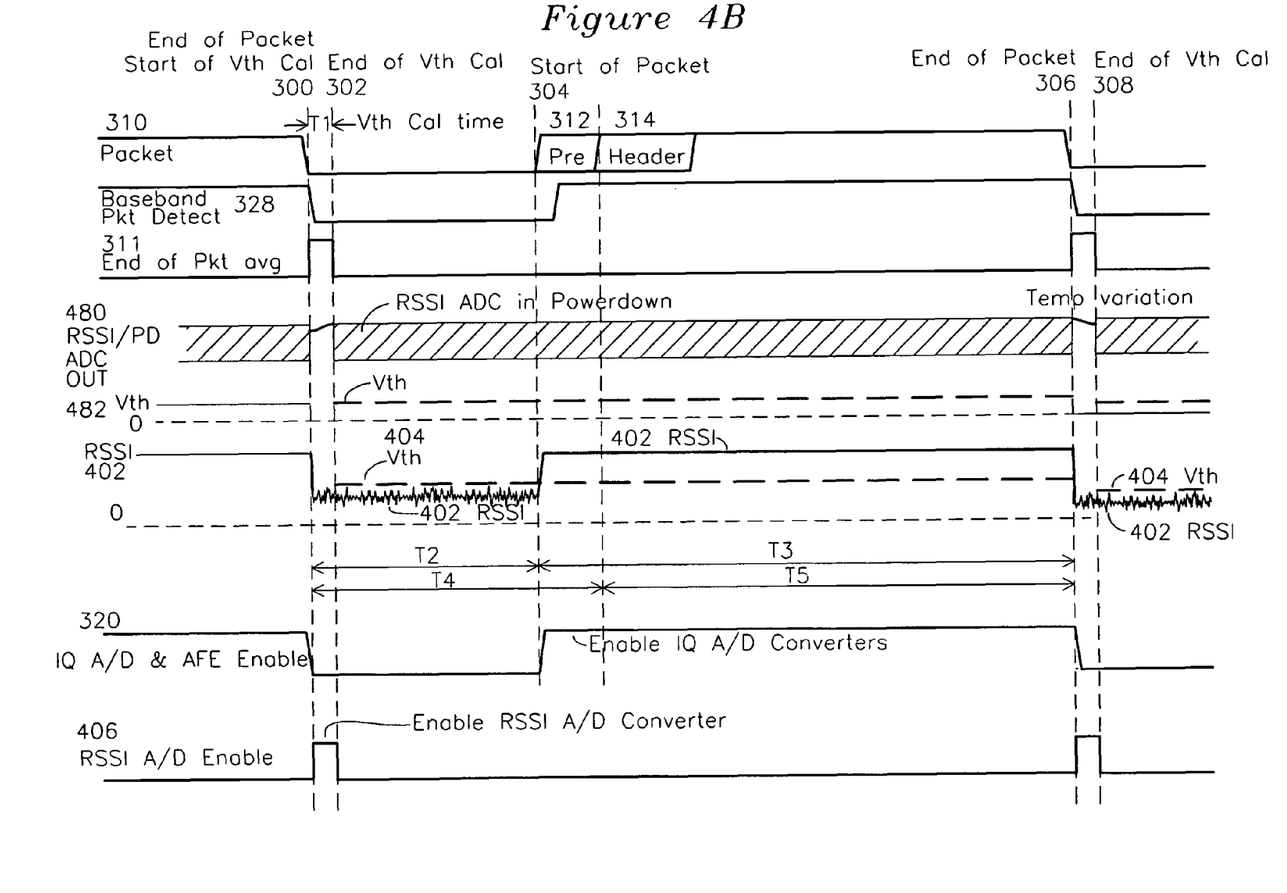
FIG. 4B shows the waveforms for the diagram of FIG. 4A.

FIG. 4B shows the timing for the operation of FIG. 4A. Packet waveform 310, baseband packet detect waveform 328 and end of packet average waveform 311 indicate waveforms which are unchanged from the waveforms and functions which generate them as described in FIG. 3. The second threshold Vth waveform 482 is valid from time 302 to start of packet time 304, where the second threshold 482 is generated from the first threshold generated by averaging RSSI ADC output 480, which ADC is only active from time 300 to time 302 and time 306 to time 308, as shown in waveform 480. In contrast with the earlier embodiment having the digital threshold comparator of FIG. 2, RSSI waveform 402 is now input to the analog comparator 452 as an analog signal (220 from FIG. 4A), and is generated by second threshold generator 462 as before, and then converted to an analog signal by DAC 456. RSSI waveform 402 is compared with the analog second threshold (Vth) 404 generated by DAC 456 which forms an analog second threshold from the digital output of the RSSI calibration module 462, and the RSSI A/D 458 enable signal 244 shown as waveform 406 is derived from the end of packet average signal 311 such that the RSSI ADC is only active during the averaging time interval which generates the first threshold, and is powered down, optionally with the RSSI calibration function 462, at other times. The output of DAC 456 may be stored in a sample and hold converter (not shown) prior to application to analog comparator 452, which would allow the DAC 456 to be additionally powered at times other than the end of packet average window T1, since the second threshold value would be stored in the sample and hold converter from the time 302 to time 304.

Figure 5A:
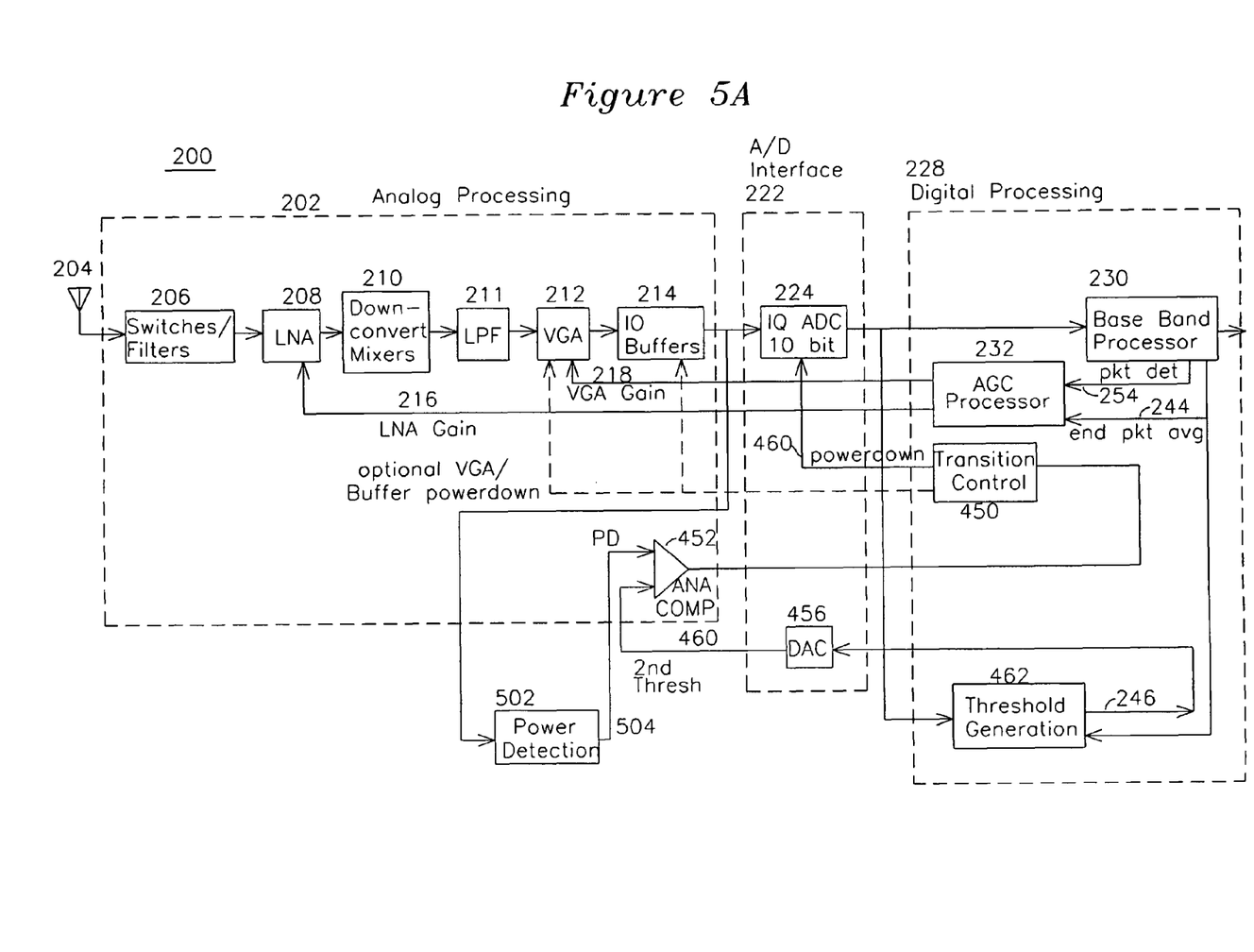
FIG. 5A shows the block diagram for another embodiment of a power saving ADC controller.

FIG. 5A shows another embodiment of the present invention, where the analog processing 202 does not generate an analog RSSI signal such as 220 of FIG. 4A, and additionally there is no RSSI ADC such as 458 of FIG. 4A. In this embodiment, a power detector 502 which is typically a processing block external to the analog processing and wireless front end 202 generates an analog Power Detect (PD) signal, such as by generating $PD=\sqrt{I^2+Q^2}$ or any monotonic approximation where I and Q are the analog in-phase and quadrature outputs, respectively, of the analog processing prior to the IQ ADC 224. The analog power detection 502 output 504 is compared by analog comparator 452 with second threshold 460 from DAC 456. The second threshold 460 is generated by the threshold generation 462 which uses the digital samples from the IQADC 224 for a short interval such as T1 following the end of a received packet. During this sample interval T1, the IQADC may use a reduced sampling rate compared to that used in sampling the packet for reduced IQADC 224 power consumption.

Figure 5B:
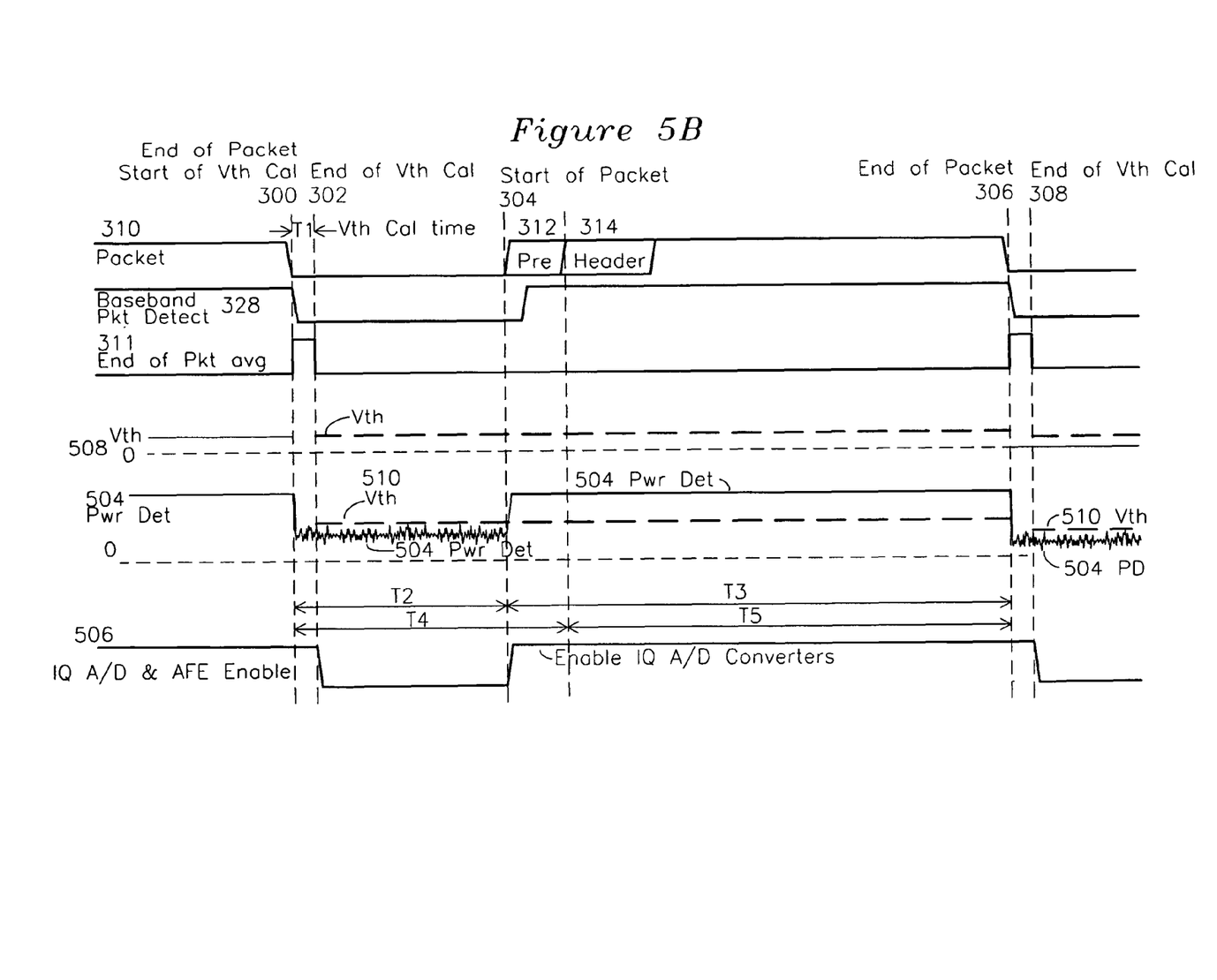
FIG. 5B shows the waveforms for the block diagram of FIG. 5A.

FIG. 5B shows the waveforms for FIG. 5A. As before, a previous and current packet are shown with waveform 310, and the baseband packet detect waveform 328 is asserted from the start of header detection to end of packet. The end of packet average waveform 311 from signal 244 is used by the threshold generator 462 in combination with digitized sampled values from the IQADC to form the first threshold, which is used to compute the second threshold signal 460 shown as waveform 508, as described earlier, and end of packet signal 244 waveform 311 is also used to extend the IQADC enable time, thereby keeping the IQ ADC waveform 506 additionally enabled during the end of packet averaging time 300 to 302, which allows the baseband processor 230 to determine the first threshold value and provide it to threshold generation 462. The second threshold signal 460 waveform 510 is applied to DAC 456 after the end of packet average 302, and the DAC 456 generates an analog second threshold voltage 508 at time 302 for comparison by analog comparator 452 to detect start of packet. One key distinction in the operation of this embodiment over the other embodiments previously described is that the IQ outputs of the analog processor 202 are sampled at a reduced rate for an interval T1 after the end of the packet, and the resulting average value is used to generate the first threshold level.

Figure 6A:
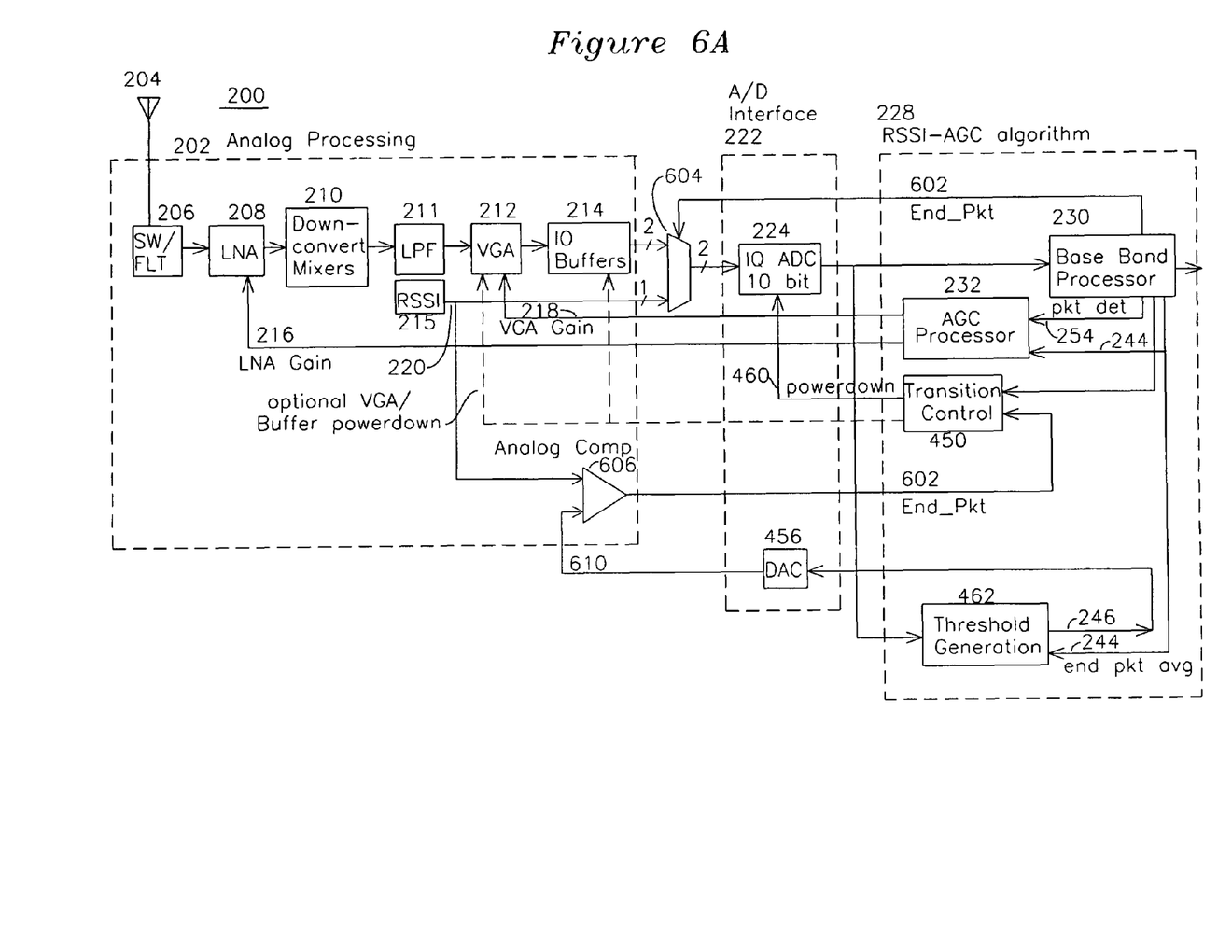
FIG. 6A shows the block diagram for another embodiment of a power saving ADC controller.

FIG. 6A shows another alternative embodiment which combines the IQ ADC converter 224 and RSSI ADC converter 226 or 458 of FIGS. 3 and 4A, respectively, since these two A/D converters are used at exclusively different time intervals. The AD converter sharing is accomplished by multiplexing 604 the IQ ADC converter between the IO buffer 214 output and RSSI 220 signal, thereby generating IQ ADC samples at full sampling speed and resolution to the baseband processor 230 during packet intervals, and generating RSSI thresholds at reduced sampling rates and optionally sampling resolutions during end of packet intervals, with the ADC in a powerdown state at other times.

Figure 6B:
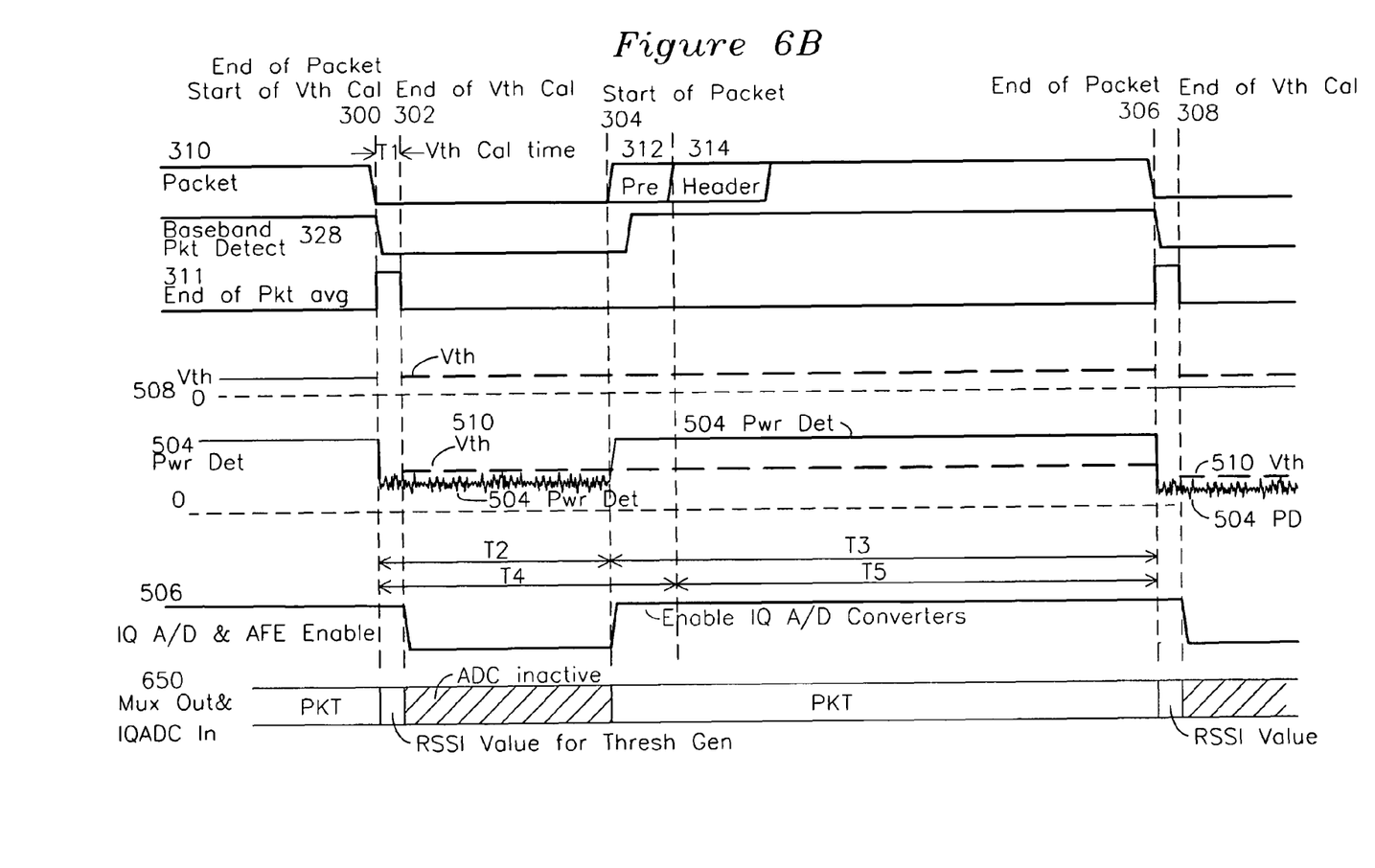
FIG. 6B shows the waveforms for the block diagram of FIG. 6A.

FIG. 6B shows the operation of the block diagram of FIG. 6A. The waveforms for the packet 310, baseband packet detect 328, and end of packet 311 are as described in the previous embodiments. During the packet interval such as T3, and IQADC 224 operates at full speed with multiplexer 602 selecting the IO buffer output 214, thereby allowing IQ samples to be provided at full rate to the baseband processor 230 as was described in the previous embodiments. After end of packet time 300, and during first threshold measurement interval T1, multiplexer signal 602 is asserted which causes mux 604 to select RSSI 215 signal 220, and the IQADC 224 digitizes RSSI, as shown in FIG. 6B waveforms 504 and 650. The digitized RSSI signal is provided to threshold generation function 462, and second threshold value 246 is computed from the first threshold value from the T1 interval as described earlier. This second threshold level 246 is provided to DAC 456 which is coupled to analog comparator 606. As described previously, once computed at time 302, second threshold value 610 may be stored in a sample and hold element and provided to the analog comparator, after which DAC function 456 may be powered down or held in a standby state. IQADC and AFE enable waveform 506 are output by the transition control function 450, and are operative to enable the IQADC converters during the packet interval such as T3 462 from packet detection as determined by energy detection as will be described, through end of packet time 300 or 306 as determined by baseband processor end of packet/average signal 311. Waveform 650 shows the time duration for which the mux output selects RSSI and the time durations for which it carries the packet IQ signal, and the interval for which the ADC is inactive. Since the RSSI signal is single ended and the IQ baseband signal comprises two signals, only one ADC is required during the RSSI measurement interval, and it is also possible to power down the unused ADC converter during measurement interval T1.

Figure 7A:
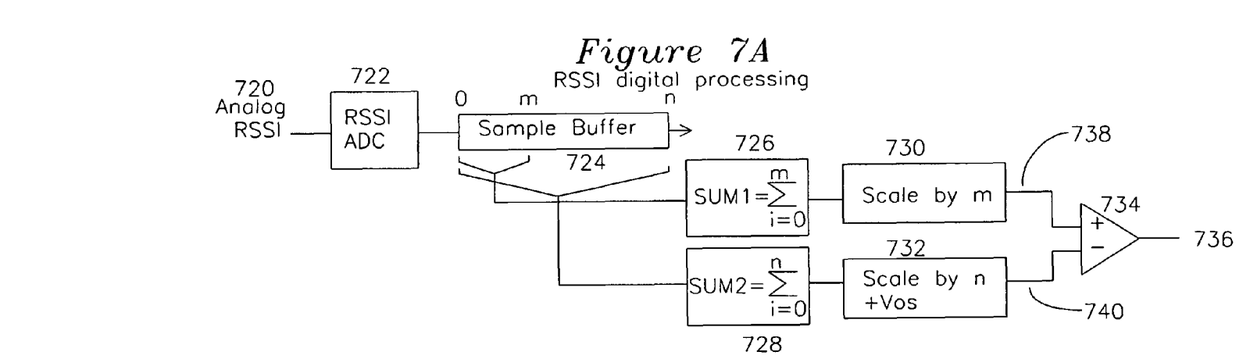
FIG. 7A shows a block diagram for RSSI threshold detection digital processing.
Figure 7B:
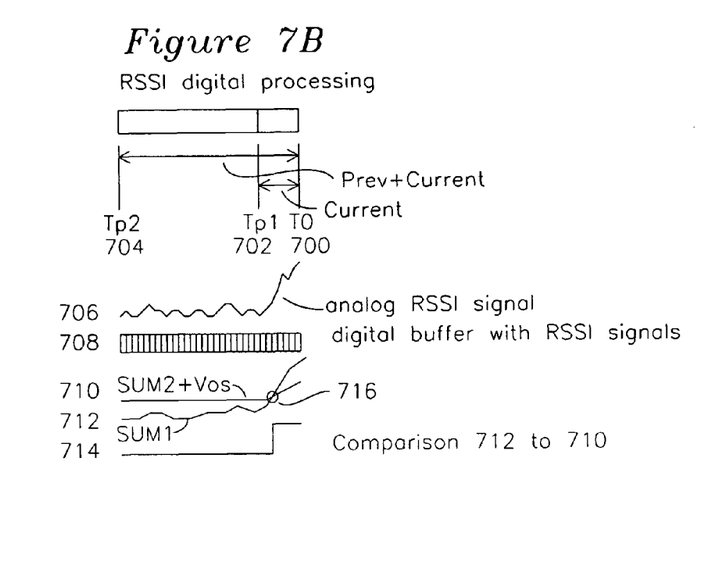
FIG. 7B shows the waveforms for FIG. 7A.

FIG. 7A shows a digital processor for early packet detection processor for a digitized RSSI signal, such as was described in FIG. 2 block 240 or FIG. 4A block 462. An analog RSSI signal 720 is digitized by ADC 722, as described earlier, and placed in a sample FIFO or buffer 724 having a depth of at least n samples, where sample 0 is the newest sample and sample n is the oldest sample. A second average value is produced over n samples as SUM2 728, which is scaled by the number of samples n 732, and an offset value Vos is added to form a comparison threshold 740. A first average value is formed by summing the same RSSI values over a shorter interval of time for form the value SUM1 726, representing a shorter history from 0 to m, where m<n. The value SUM1 is scaled by m 730, and compared 734 with a comparison threshold of (SUM2/n+Vos) to form output 736 which asserts when there is a recent increase in RSSI level. The values for m and n are matters of performance which are noise-dependant, as short values of m may result in false triggering, and large values of m may result in delayed detection of increased energy. I may be found that values of m in the range 48-64 work will for the 802.11 wireless LAN family, and the sample rate is dependant on the particular LAN protocol being received. The operation of FIG. 7A is understood in combination with the waveforms of FIG. 7B, where RSSI analog input 706 is digitized and placed in buffer 708, and waveform 710 represents the long sum interval output 740 of FIG. 7A. A normalized SUM1 such as output 738 is shown as waveform 712, which is compared with comparison threshold waveform 710, and at point 716, the shorter time interval average normalized SUM1 738 crosses the comparison threshold resulting in the assertion of output 736 shown in detection waveform 714.

Figure 8A:
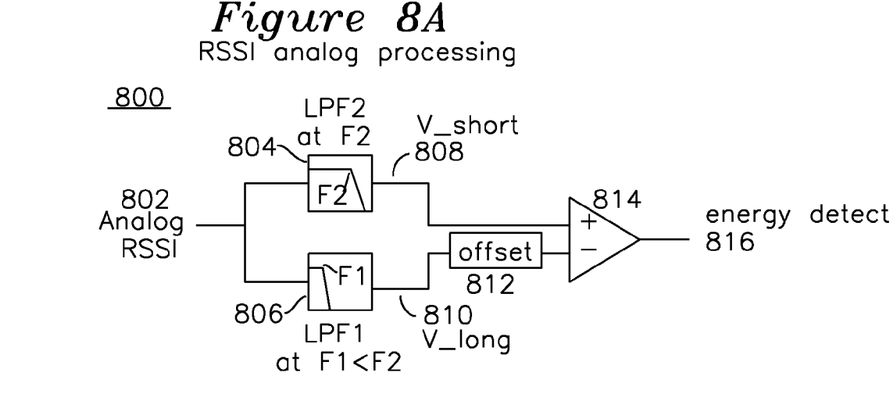
FIG. 8A shows a block diagram for RSSI threshold detection analog processing.
Figure 8B:
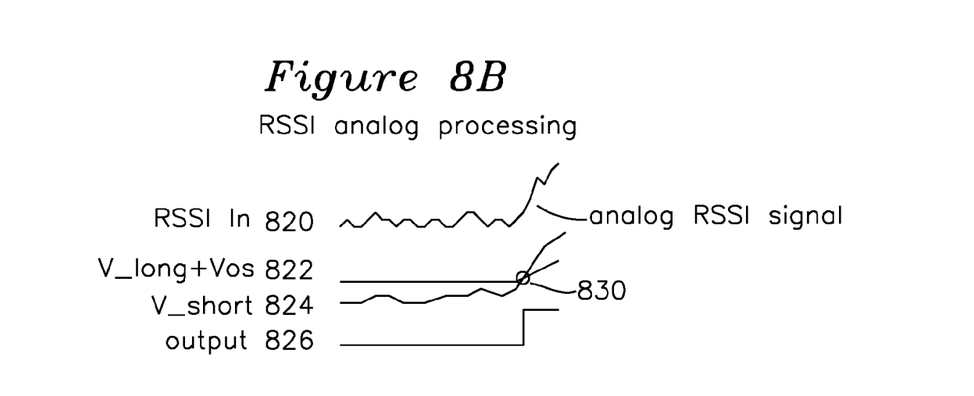
FIG. 8B shows the waveforms for FIG. 8A.

FIG. 8A shows the analog processing 800 for RSSI early packet detection. Analog RSSI signal 802 is coupled to a first analog low pass filter LPF1, which has a low cutoff frequency F1, corresponding to long term averaging and producing value V long 810. The analog RSSI signal 802 is also coupled to a second analog low pass filter LPF2 804 at cutoff frequency F2, where F2>F2, corresponding to a shorter response time and generating output V short 808. Comparator 814 compares V short 808 with V long 810 with an offset Vos 812 added, and when V short exceeds this threshold, output 816 is asserted. The waveforms for FIG. 8A are shown in FIG. 8B. Analog RSSI input 820 increases when the input signal level increases, and V long+Vos 822 establishes the comparison threshold based on long-term averaging of noise and interference levels. When V short 824 exceeds this level at crossover point 830, the output 826 is asserted.

Figure 8C:
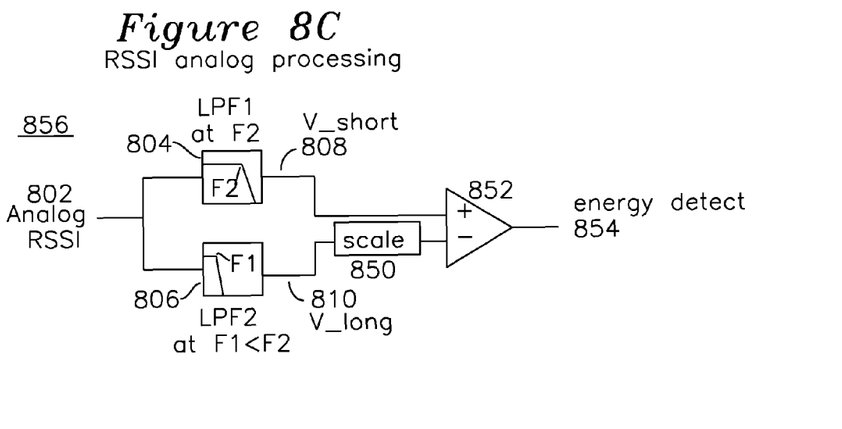
FIG. 8C shows a block diagram for RSSI threshold detection analog processing.

FIG. 8C shows a variation 856 of FIG. 8A, where the comparison 852 is done between V short 808 and V long 810 which has been multiplied by a scaling constant, and may also include an offset Vos (not shown). In this manner, energy detect 854 is generated. As with FIG. 8A, the values of F1, F2, Vos and the scale factor may be varied to achieve the best result. In general, it is believed that an offset value which represents a few db of signal level increase to cause a trigger is desired, and as was described for the digital processor, F1 should be low enough to track packet-by-packet variations in noise and interference, while F2 should correspond to a time response on the level of several symbols such that the preamble may be detected by the baseband processor following the detection of RSSI increase.

Figure 9:
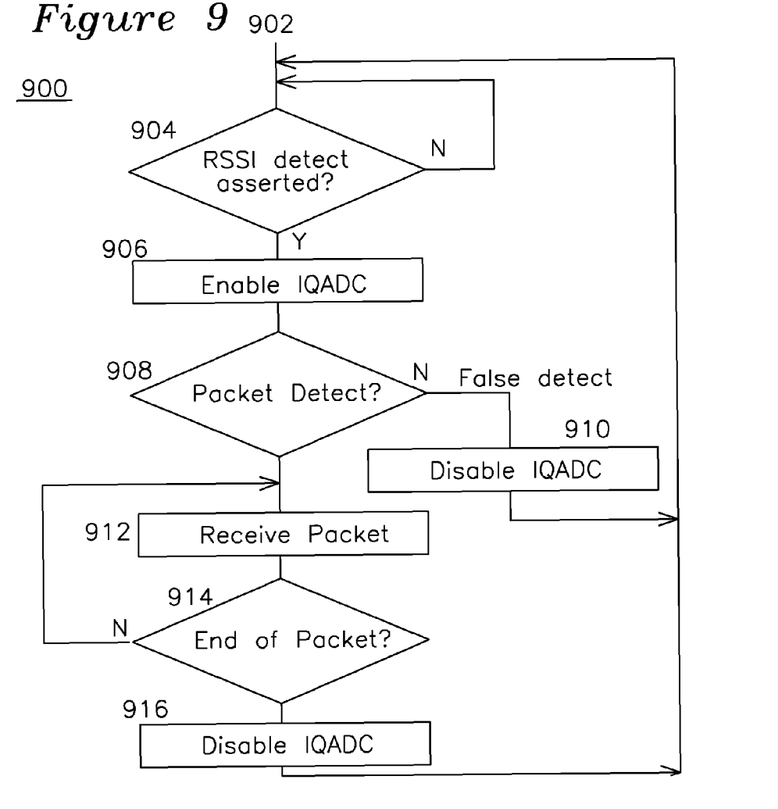
FIG. 9 shows a flowchart for the processing of RSSI detection.

FIG. 9 shows a flowchart 900 for handling of an assertion of RSSI detect from output 816 of FIG. 8A, 854 of FIG. 8C, or any of the preceding RSSI detection block diagrams. Step 904 examines the RSSI detect assertion such as output 816 of FIG. 8A. If asserted, the IQADC is enabled 906, after which baseband processor packet detect is examined in step 908, such as by detection of a wireless packet preamble as described in the prior art and particularly in the IEEE 802 wireless LAN standards. After an interval of time, if packet detect such as by preamble detection does not occur, the IQADC is disabled 910 and the process returns to step 902 waiting for the next RSSI detect assertion. If a packet is detected, step 912 receives the packet, and end of packet 914 test determines whether to disable the IQADC 916 and return to step 902 until the next packet arrives, or to continue receiving the current packet 912. It should also be noted that additional power savings alternative are available during steps 912 and 914. "End of packet" may also be interpreted to mean a packet which is not for the present station, such as by examining destination MAC address and finding the destination address does not match the current station. In this manner, the IQADC is only enabled during the intervals when a packet may be arriving, and continues to operate only when the packet which is arriving is destined for the present station.

The various embodiments described herein are for example only to understand the invention, and are not intended to limit the scope only to the combinations shown herein. For example, the transition control processor 450 shown on the output of the comparator 452 of FIG. 4A may be used to condition the comparator output to ensure against glitches passing through the comparator. Similarly, the use of an adaptive threshold increment from first threshold to second threshold may be used in any of the embodiments described herein. Combinations of processing elements found in each embodiment may be used with the other embodiments and still practice the invention described herein.

The power saving aspects of the invention may also be practiced using any method which reduces the power consumption of the processing function which consumes power. Among the prior art known methods of reducing power are reducing the clock rate, putting the function into a standby mode, removing or reducing power to the device, or any known method. It is also known in the prior art that some of the powerdown methods have an associated recovery time before an operational state is reached, and it is understood that any delay associated with the transition from powerdown state to operational state must be accounted for in the timings shown in the figures.

We claim:
1. A signal processor for a wireless receiver, the signal processor having:
   an analog processor including:
      a first amplifier coupled to an antenna receiving wireless signals;
      a mixer coupled to said first amplifier and generating a quadrature baseband signal;
      a second amplifier coupled to said quadrature baseband signal and having a second amplifier output;
   an IQ analog to digital converter (IQ ADC) coupled to said second amplifier output, said IQ ADC having a powerdown state and an operational state;
   a baseband processor coupled to said analog to digital converter outputs and generating a packet detect signal including an end of packet averaging signal;
   a received signal strength indicator (RSSI) which varies with the strength of said wireless signals;
   a threshold generator forming a first threshold from said RSSI signal by averaging said RSSI signal when said end of packet averaging signal is active, thereby forming a second threshold formed by increasing said first threshold by a threshold increment;
   whereby said IQ ADC operates at said operational state when said RSSI exceeds said second threshold and said IQ ADC operates at said powerdown state at other times.

2. The signal processor of claim 1 where said threshold increment is between 1 and 5 dB of said first threshold.

3. The signal processor of claim 1 where said first threshold is formed from the sum of 128 samples of said RSSI ADC divided by 128.

4. The signal processor of claim 1 where said first threshold is formed from the sum of 256 samples of said RSSI ADC divided by 256.

5. The signal processor of claim 1 where said second threshold is said first threshold plus 1 to 5 dB.

6. The signal processor of claim 1 where said second threshold is greater than 2 dB above said first threshold.

7. The signal processor of claim 1 where said wireless signals are 802.11a or 802.11g wireless signals.

8. The signal processor of claim 1 where said powerdown state includes at least one of: reducing a clock rate, removing an applied voltage, reducing an applied voltage, or enabling a standby mode.

9. The signal processor of claim 8 where at least one of said first amplifier or said second amplifier is set to a higher gain from said end of packet signal to said start of packet than after said start of packet.

10. The signal processor of claim 8 where at least one of said first amplifier or said second amplifier is set to a higher gain from said end of packet signal to said start of packet than after said start of packet.

11. The signal processor of claim 1 where said RSSI is generated at the output of said mixer by said analog processor.

12. The signal processor of claim 1 where said RSSI is proportional to said received wireless signal.

13. The signal processor of claim 1 whereby at least one of said first amplifier or said second amplifier is active when said RSSI exceeds said second threshold and in a powerdown state at other times.

14. The signal processor of claim 1 whereby said analog processing includes IO buffers from said second amplifier to said IQ ADC, said IO buffers active when said RSSI exceeds said second threshold and in a powerdown state at other times.

15. A signal processor for a wireless receiver, the signal processor having:
- a first amplifier coupled to an antenna;
- a mixer coupled to said first amplifier and generating a quadrature baseband signal;
- a second amplifier coupled to said quadrature baseband signal and having a second amplifier output;
- a quadrature analog to digital converter (IQ ADC) coupled to said second amplifier output, said IQ ADC having a powerdown state and an operational state;
- a baseband processor coupled to said analog to digital converter outputs and demodulating incoming symbols, said baseband processor also generating an end of packet signal;
- an RSSI calibration function for computing a first threshold by averaging said RSSI for an interval following said end of packet signal, said RSSI calibration function producing a second threshold by adding a threshold increment to said first threshold;
- said second threshold compared to said RSSI signal and generating a start of packet indication when said RSSI exceeds said second threshold;
- whereby said IQ ADC is in said operational state when said RSSI exceeds said second threshold, and said IQ ADC is in said powerdown state at other times.

16. The signal processor of claim 15 where said threshold increment is 1 to 5 dB of said first threshold.

17. The signal processor of claim 15 where said first threshold is formed from the sum of 128 samples of RSSI divided by 128.

18. The signal processor of claim 15 where said first threshold is formed from the sum of 256 samples of RSSI divided by 256.

19. The signal processor of claim 15 where said second threshold is said first threshold plus 1 to 5 dB.

20. The signal processor of claim 15 where said second threshold is greater than 2 dB above said first threshold.

21. The signal processor of claim 15 where said wireless signals are 802.11a or 802.11g wireless signals.

22. The signal processor of claim 15 where powerdown state includes at least one of: reducing a clock rate, removing an applied voltage, reducing an applied voltage, or enabling a standby mode.

23. The signal processor of claim 15 where said RSSI is generated at the output of said mixer by said analog processor.

24. The signal processor of claim 15 where said RSSI is proportional to said received wireless signal.

25. The signal processor of claim 15 whereby said second amplifier is active when said RSSI exceeds said second threshold and in a powerdown state at other times.

26. The signal processor of claim 15 whereby said analog processing includes IO buffers from said second amplifier to said IQ ADC, said IO buffers active when said RSSI exceeds said second threshold and in a powerdown state at other times.

* * * * *